April 25, 1933.  J. B. HADAWAY  1,906,059
FOCUSING DEVICE FOR CAMERAS
Filed Nov. 16, 1929  3 Sheets-Sheet 1

Inventor.
John B. Hadaway
By his attorney
Robert L. Feist

April 25, 1933.  J. B. HADAWAY  1,906,059
FOCUSING DEVICE FOR CAMERAS
Filed Nov. 16, 1929  3 Sheets-Sheet 3

Inventor.
John B. Hadaway
By his attorney
Robert L. Geist

Patented Apr. 25, 1933

1,906,059

UNITED STATES PATENT OFFICE

JOHN B. HADAWAY, OF SWAMPSCOTT, MASSACHUSETTS

FOCUSING DEVICE FOR CAMERAS

Application filed November 16, 1929. Serial No. 407,769.

This invention relates to focusing devices for cameras, and it is herein illustrated as embodied in a motion-picture camera.

In motion-picture cameras as heretofore constructed, it has been common practice to provide a plurality of photographic lenses which may be selectively associated with the photographic aperture of the camera to provide for the taking of pictures including fields of various sizes and at varying distances. Sensitized film upon which the pictures are taken is customarily advanced along a fixed plane at right angles to the optical axis of the photographic aperture. Unless the photographic lens used is of very short focal length, focusing of the lens is necessary in order to produce a sharp picture upon the film, and to this end lens mountings are commonly so made that the lenses can be shifted slightly toward or away from the film, the mountings usually bearing graduations to indicate the distance of an object from the camera at which the lens will be in focus for taking a picture of that object. In operating well-known types of motion-picture cameras, it is customary to make use of a view-finder, which forms part of the camera, in observing an object or scene and for determining the field of view which it is desired to cover. A lens of the proper focal length for that field of view is then selected and the lens mounting is adjusted to focus the lens according to the estimated distance of the object from the camera.

Considerable difficulty has been experienced in operating cameras in the manner above set forth by reason of the fact that the graduations on the lens mountings may be inaccurate or difficult to read and that it is exceedingly difficult for an inexperienced person to estimate distances accurately. The result of this is that the photographic lens used is frequently not adjusted to the proper focus, and accordingly the pictures taken are blurred or indistinct. This is particularly evidenced in those cases in which lenses of long focal lengths are used, such as in telephoto work, the condition being aggravated by the decreased depths of foci of such lenses, it being practically impossible by indirect methods to estimate the distance closely enough to obtain sufficiently sharp focusing of the lens requisite for the production of good pictures.

In view of the foregoing, the object of my invention is to provide an improved view-finder and lens-shifting device for cameras which will make it possible to focus photographic lenses accurately and rapidly without necessitating the removal of the lenses from the camera. To this end and as illustrated, I have provided a camera comprising a housing having therein a photographic aperture, a view-finder mounted outside of the housing, and a lens mounted for movement selectively into association with the view-finder or with the photographic aperture, the arrangement being such that the lens can be moved selectively into alinement with the view-finder for focusing the lens or into position in alinement with the photographic aperture for taking pictures. Preferably the lens is mounted upon a lens shifter or carrier in the form of a turret at the forward portion of the camera housing, said turret providing a mounting for additional lenses of different focal lengths any one of which may be focused by the view-finder and moved into position for taking pictures. By the arrangement set forth it is possible to adjust readily the focus of any one of the several lenses carried by the turret so that the objects in the required field of view will be sharply focused upon the film when the lens is placed in position for taking pictures. Thus it will be apparent that I have provided a simple and effective device for focusing lenses without removing them from the camera and one which renders it possible accurately and rapidly to adjust a camera for taking pictures under varying conditions.

Other objects of the invention and details of construction will be set forth in the detailed description and in the claims.

Figure 1:
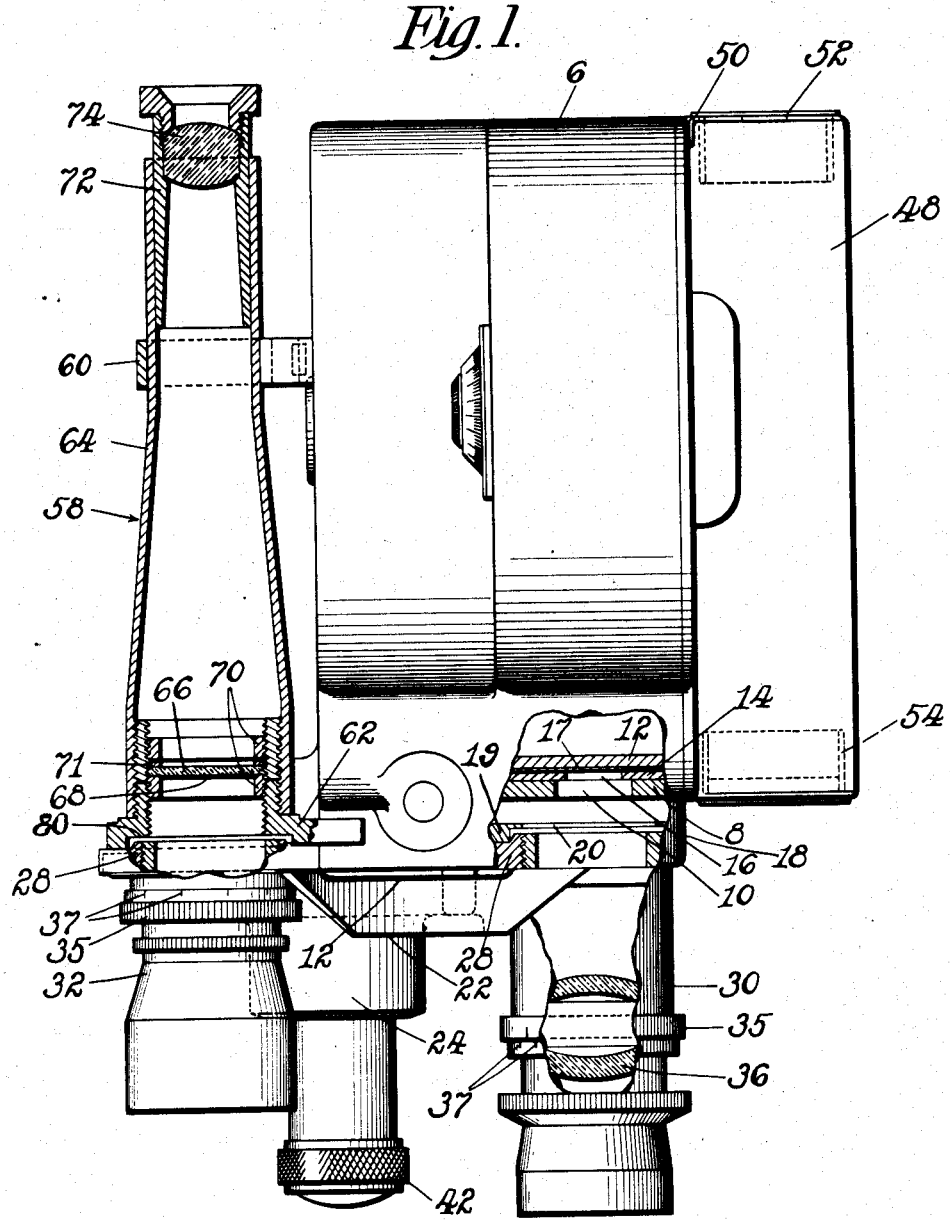
Fig. 1 is a plan view, partly in section, of a motion-picture camera embodying my invention.

As illustrated by the drawings, my invention is embodied in a motion-picture camera of the hand type. This camera comprises a metal casing or housing 6 having a front end wall 8 which is provided with an opening 10. Rearwardly of the end wall 8 are positioned a film guide plate 12 and a second plate 14 in the central portion of which, in alinement with the opening 10, is a rectangular aperture 16 forming what is commonly known as a photographic or exposure aperture through which light may pass to sensitized film 17 which is fed past the aperture between the plates 12 and 14. Within the housing 6 are contained film-feeding mechanism, not shown, which may be of any suitable and well-known construction. Projecting from the end wall 8 is a flange 18 containing shutter mechanism, not shown, and having a cover plate 19 provided with a recess 20.

Figure 3:
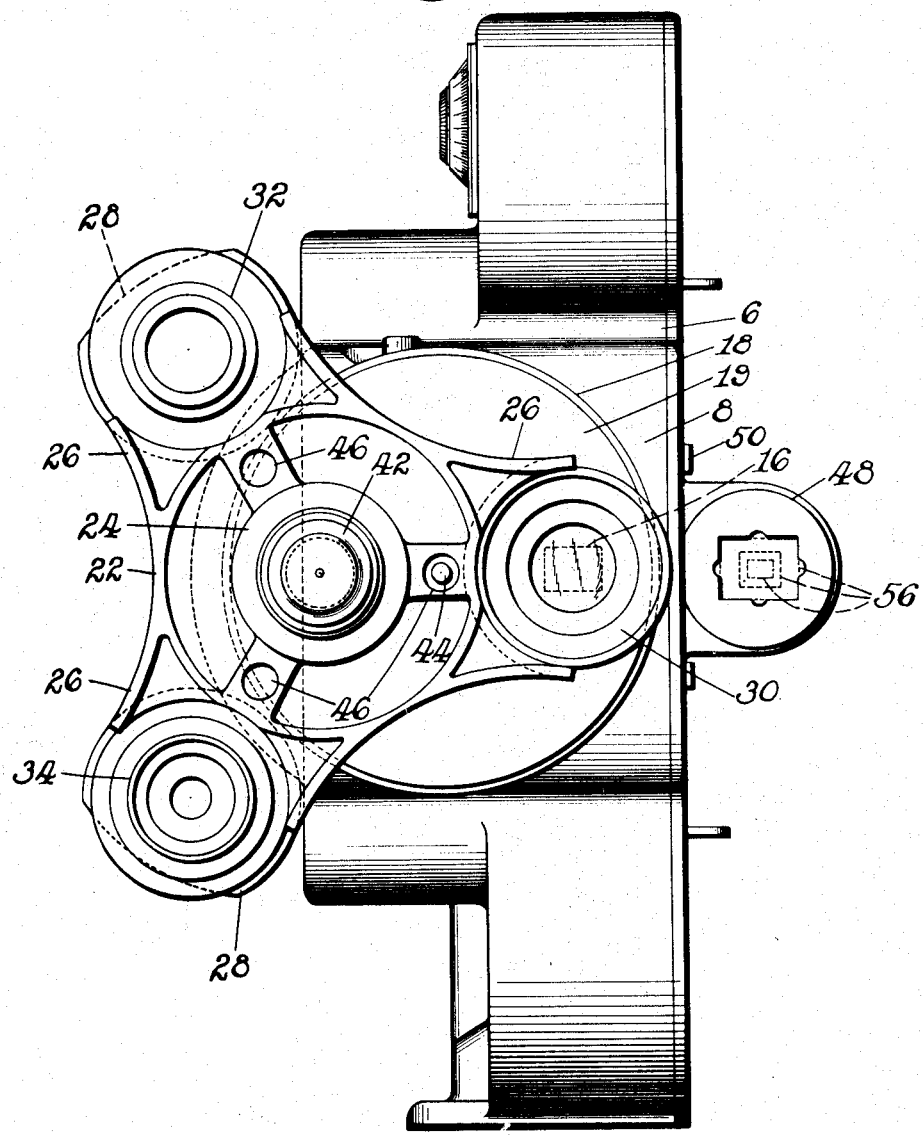
Fig. 3 is a front view of the camera.

Laterally of the central part of the cover plate 19 of the housing 6 is carried a stud 21 forming a bearing upon which is mounted a lens shifter or carrier comprising a turret 22, best shown in Fig. 3. The turret comprises a hub 24 from which extend three arms 26 located 120° apart. The arms have at the ends thereof screw-threaded projecting flange portions 28 (Fig. 1) arranged to receive and to support lenses 30, 32 and 34. These lenses are of a common type, having adjustable mountings (not shown in detail) including a movable collar 35 which, when turned, will move the objective 36 of the lens inwardly or outwardly as desired. The setting of the lens can be determined by graduations 37 on the collar. Preferably, such lenses are of different focal lengths as required for obtaining sharp and sufficiently large pictures of objects at different distances. The relative locations of the stud 21, flange portions 28, and aperture 16 are such that the optical axis of any one of the lenses can be brought into coincidence with the optical axis of the photographic aperture by rotating the hub 24 on the stud 21. By this construction any one of the lenses can be selectively located in association with the photographic aperture 16 in picture-taking position.

In order to exclude light from the joint between the housing and the lens, the recess 20 in the cover plate 19 is shaped to receive the projecting flange portion 28 of any one of the arms 26 when the lens carried by the flange is in alinement with the aperture 16. It is to be noted that the hub 24 is rotatably and slidably mounted upon the stud 21, the turret being forced toward the plate 19 by a spring 40. In adjusting a lens into picture-taking position the turret is grasped by a knob 42 on the end of the hub 24, is pulled outwardly, and is then turned until the required lens is in alinement with the photographic aperture, whereupon when the turret is released the spring 40 will force the lens into position with the flange 28 on the lens arm mounting in position in the recess 20. To assist in guiding a selected lens into picture taking position and to lock the lens in such position, there is provided a pin 44 on the plate 19 in position to enter one or another of holes 46 in the turret when a lens is located in alinement with the photographic aperture.

For determining which of the lenses carried by the turret should be utilized in taking pictures, use is made of a view-finder 48 secured by brackets 50 to the housing 6 and having an eye-piece 52 and a finder-lens 54 upon which are marked (dotted lines 56, Fig. 3) the limits of the fields of the corresponding lenses of various focal lengths carried by the turret. The scene or object to form the subject of the picture is observed through the view-finder and the size of the field required is noted. The nearest corresponding lens is selected, is focused by adjusting the lens in its mounting by setting the collar 35 to correspond to the estimated distance from the camera to the scene or object, and the lens is then placed in alinement with the photographic aperture.

Figure 2:
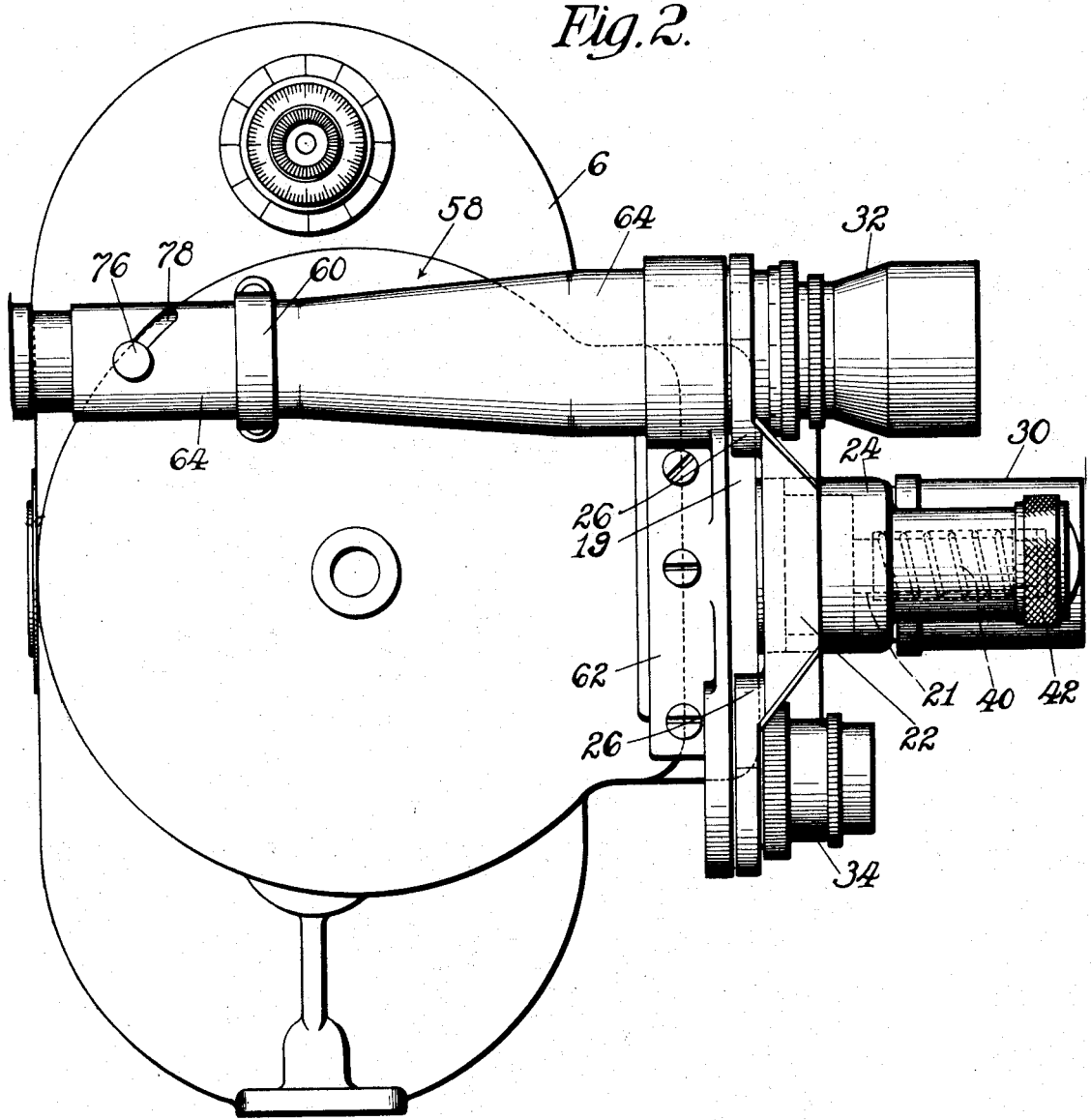
Fig. 2 is a side view of the camera, showing a lens in alinement with the view-finder.

I have provided an auxiliary view-finder for use in connection with the lenses carried by the turret 22 for accurately focusing the lenses without removing them from the camera. To this end, a view-finder 58 is mounted in brackets 60 and 62 upon the side of the housing 6. This view-finder comprises a tube 64 in the forward end of which is positioned an objective 66 having a ground-glass viewing surface 68 and held in the tube 64 by retaining rings 70 and a fiber washer 71. Slidably mounted in the inner end of the tube 64 is an eye-piece 72 comprising a magnifying lens 74. The eye-piece 72 carries a set-screw 76 (Fig. 2) which engages with the walls of a curved slot 78 in the tube 64 so constructed that upon turning the eye-piece the latter is moved inwardly or outwardly of the finder-tube and can be locked in adjusted position by tightening the set-screw. This adjustment of the eye-piece is for the purpose of accommodating the view-finder to the eye of the observer.

It is to be noted that the optical axis of the auxiliary view-finder 58 is parallel to that of the photographic aperture and that the viewing surface 68 of the objective lies in the plane of the film 17 as it is guided over the plate 12. Consequently, an image of an object viewed through the eye-piece 72 upon the viewing surface will correspond to that appearing on the sensitized film 17. The view-finder 58 is located relatively to the stud 21 at an angle of about 30° from the horizontal so that, when one of the lenses, for example the lens 30 (Fig. 1), is in picture-taking position, another lens, such as lens 32 will be in alinement with the optical axis of the view-finder 58, a recess 80 being provided in the bracket 62 to receive and seat the flange portion 28 of the lens-carrying arm. This prevents leakage of light into the view-finder tube.

When it is desired to use the camera for taking pictures of a given object, the operator sights through the view-finder 48 and, by means of the markings 56, determines what field of view is required, selects the lens which corresponds to that field by making use of the turret in the manner above described, and places the lens in alinement with the auxiliary view-finder 58. Upon sighting through the view-finder at the object, the lens can be focused by turning its collar 35 until the image of the object appears sharply upon the viewing surface 68 of the finder. The lens is then shifted into alinement with the photographic aperture 16 and the camera is ready for operation. The object which is to be photographed can then be observed either through the view-finder 48 or through the auxiliary view-finder 58, in which latter case the lens which happens to be associated with the finder 58 is focused upon the object. This method of operation is advantageous in that, by viewing the object through the auxiliary view-finder 58, its image is enlarged by the magnifying eye-piece, thus facilitating observation of the object to be photographed.

It is to be noted that the auxiliary view-finder 58 is positioned above the central portion of the camera housing so that it does not interfere with the winding of the motor for the film-feeding mechanism, and furthermore that the eye-piece 72 extends rearwardly of the camera housing into a position which is readily accessible to the operator.

Having described my invention, what I claim as new and desire to secure by Letters Patent of the United States is:—

1. A motion-picture camera comprising a housing in the front face of which is located a photographic aperture, a view-finder carried by the housing and located laterally thereof, and a turret rotatably mounted upon the housing and carrying a plurality of photographic lenses, the relative locations of the view-finder, photographic aperture, and turret being such that each of the lenses can be rotated to place the optical axis thereof in alinement with that of the view-finder in focusing the lens, or in alinement with the optical axis of the photographic aperture for locating the lens in picture-taking position.

2. A motion-picture camera comprising a housing having therein a photographic aperture, a turret having a plurality of spaced arms each of which is adapted to receive and support at its end a photographic lens, a bearing on the housing upon which the turret is rotatably mounted and so positioned relatively to the aperture that lenses carried by the arms can be rotated selectively into alinement with the aperture, and a view-finder disposed laterally of the housing in such position relatively to the aperture and turret that one of the lenses can be placed in alinement with the aperture with a second lens located in alinement with the view-finder.

3. A motion-picture camera comprising a housing having therein a photographic aperture, and a recess in alinement with the aperture, a lens carrier having a flange in which is mounted a photographic lens, and a view-finder tube carried on the housing and having a recess in one end thereof, the lens carrier being rotatably mounted on the housing for movement relatively to the aperture and view-finder tube so that the lens can be located in alinement with the photographic aperture with said flange seated in the recess in the housing or in alinement with the axis of the view-finder tube with the flange seated in the recess in said tube.

In testimony whereof I have signed my name to this specification.

JOHN B. HADAWAY.